(12) United States Patent
Kirman

(10) Patent No.: US 9,493,368 B2
(45) Date of Patent: Nov. 15, 2016

(54) HARDNESS REDUCTION APPARATUS AND METHOD

(71) Applicant: Tangent Company LLC, Chagrin Falls, OH (US)

(72) Inventor: Lyle E. Kirman, Cleveland Heights, OH (US)

(73) Assignee: TANGENT COMPANY LLC, Chagrin Falls, OH (US)

(*) Notice: Subject to any disclaimer, the term of this patent is extended or adjusted under 35 U.S.C. 154(b) by 55 days.

(21) Appl. No.: 14/421,045

(22) PCT Filed: May 2, 2013

(86) PCT No.: PCT/US2013/039223
§ 371 (c)(1),
(2) Date: Feb. 11, 2015

(87) PCT Pub. No.: WO2013/166255
PCT Pub. Date: Nov. 7, 2013

(65) Prior Publication Data
US 2015/0191369 A1    Jul. 9, 2015

Related U.S. Application Data

(60) Provisional application No. 61/642,046, filed on May 3, 2012, provisional application No. 61/669,773, filed on Jul. 10, 2012.

(51) Int. Cl.
*C02F 1/46* (2006.01)
*C02F 1/463* (2006.01)
(Continued)

(52) U.S. Cl.
CPC .............. *C02F 1/463* (2013.01); *C02F 1/20* (2013.01); *C02F 1/4602* (2013.01); *C02F 1/66* (2013.01);
(Continued)

(58) Field of Classification Search
CPC ............. C02F 1/463; C02F 1/4602; C02F 1/4618; C02F 1/46115; C02F 1/4613;
(Continued)

(56) References Cited

U.S. PATENT DOCUMENTS 2,535,035 A * 12/1950 Briggs .................. C02F 1/4602
                                                       204/263
3,476,675 A * 11/1969 Colvin ...................... C25B 9/06
                                                       204/242
(Continued)

FOREIGN PATENT DOCUMENTS

EA           12633 B1    12/2009
RU       2064818 C1     8/1996
(Continued)

OTHER PUBLICATIONS

Mazanko et al., Promyshlenny membranny elektroliz, Moskava, "Khimiya", 1989, p. 114.
(Continued)

*Primary Examiner* — Arun S Phasge
(74) *Attorney, Agent, or Firm* — Pearne & Gordon LLP

(57) ABSTRACT

A method of precipitating scale from water includes providing an electrochemical cell. The electrochemical cell includes a primary cathode chamber including a first electrode therein, a primary anode chamber including a second electrode therein, and a cation exchange membrane separating the primary cathode chamber from the primary anode chamber. A flow of feed water is split into separate input flows to each of the primary cathode chamber and the primary anode chamber. The pH of the water in the primary anode chamber is reduced by electrolysis. The pH of water in the primary cathode chamber is increased by electrolysis, and cations are removed from the water in the primary cathode chamber by forming scale on the first electrode in the primary cathode chamber. Separate treated water output (Continued)

flows, from each of the primary cathode chamber and primary anode chamber, are combined into a combined conditioned water flow.

21 Claims, 10 Drawing Sheets

(51) Int. Cl.
  *C02F 1/20* (2006.01)
  *C02F 1/66* (2006.01)
  *C02F 1/461* (2006.01)
  *C02F 101/10* (2006.01)
  *C02F 103/02* (2006.01)

(52) U.S. Cl.
  CPC .......... *C02F 1/4618* (2013.01); *C02F 1/46104* (2013.01); *C02F 2001/46119* (2013.01); *C02F 2101/10* (2013.01); *C02F 2103/023* (2013.01); *C02F 2201/4613* (2013.01); *C02F 2201/46115* (2013.01); *C02F 2209/06* (2013.01); *C02F 2209/07* (2013.01); *C02F 2303/14* (2013.01); *C02F 2303/22* (2013.01)

(58) Field of Classification Search
  CPC ............... C02F 1/46119; C02F 1/46104; C02F 2001/46119; C02F 2303/22; C02F 2209/06; C02F 2209/07
  See application file for complete search history.

(56) References Cited

U.S. PATENT DOCUMENTS

| | | |
|---|---|---|
| 4,533,451 A | 8/1985 | Kumazawa |
| 5,152,904 A | 10/1992 | Kedem et al. |
| 5,510,009 A | 4/1996 | Arai et al. |
| 6,187,154 B1 | 2/2001 | Yamaguchi et al. |
| 6,551,492 B2 | 4/2003 | Hanaoka |
| 6,855,233 B2 | 2/2005 | Sawada |
| 7,083,718 B2 | 8/2006 | Beaupre |
| 7,396,441 B2 | 7/2008 | Senkiw |
| 7,513,980 B2 | 4/2009 | Miyashita et al. |
| 7,713,403 B2 | 5/2010 | Kamitani |
| 8,211,288 B2 * | 7/2012 | Hung ..................... A61L 2/035 205/701 |
| 2007/0187263 A1 * | 8/2007 | Field .................... C02F 1/4618 205/742 |

FOREIGN PATENT DOCUMENTS

| | | |
|---|---|---|
| SU | 454180 A | 12/1974 |
| SU | 1455121 A1 | 1/1989 |
| SU | 1562325 A1 | 5/1990 |

OTHER PUBLICATIONS

The International Search Report issued in International PCT Application No. PCT/US2013/039223, (2013).
BiOSTAT Proven lime-scale protection for commercial applications brochure; Judo Wasser-Aufbereitung GmbH, P.
Dolphin WaterCare Treating Water Responsibly, Dolphin Water Care, downloaded from http://www.dolphinwatercare.com/dolphinworks.aspx.
Moon, et al., Application Study on an Electrolytic softening Reactor for the Removal of Calcium Hardness in Cooling Tower Water Systems; IWC-09-48.
Totally Clean Efficient Water Treatment Systems; Pages printed from www.eH2O.com.

* cited by examiner

HARDNESS REDUCTION APPARATUS AND METHOD

CROSS-REFERENCE TO RELATED APPLICATIONS

Benefit of U.S. Provisional Patent Application Ser. No. 61/642,046 filed May 3, 2012, and U.S. Provisional Patent Application Ser. No. 61/669,773 filed Jul. 10, 2012 is hereby claimed and the disclosures incorporated herein by reference.

BACKGROUND OF THE INVENTION

1. Field of the Invention

The present invention is related to water treatment and in particular to systems and methods for precipitating scale from water.

2. Description of Related Art

It is known to use electrolytic current to precipitate solids from water. For example, it is known to use electrolytic current to precipitate solids from water in evaporative cooling applications, such as cooling towers. Such systems typically require manual cleaning and are not suitable for residential water conditioning due to their inefficiency at low hardness concentrations.

BRIEF SUMMARY OF THE INVENTION

The methods, systems and apparatuses discussed below relate to precipitating scale from water. The following summary will provide a basic understanding of some aspects of the methods, systems and apparatuses discussed below. This summary is not an extensive overview and is not intended to delineate the scope of such methods, systems and apparatuses. Its sole purpose is to present some concepts in a simplified form as a prelude to the more detailed description that is presented later.

In accordance with one aspect of the invention, provided is a method of precipitating scale from water. The method includes providing an electrochemical cell. The electrochemical cell includes a primary cathode chamber including a first electrode in the primary cathode chamber, a primary anode chamber including a second electrode in the primary anode chamber, and a cation exchange membrane separating the primary cathode chamber from the primary anode chamber. A flow of feed water is split into separate input flows to each of the primary cathode chamber and the primary anode chamber. The pH of the water in the primary anode chamber is reduced by electrolysis. The pH of water in the primary cathode chamber is increased by electrolysis, and cations are removed from the water in the primary cathode chamber by forming scale on the first electrode in the primary cathode chamber. Separate treated water output flows, from each of the primary cathode chamber and primary anode chamber, are combined into a combined conditioned water flow.

In certain embodiments, the electrochemical cell treats the water in the primary cathode chamber and the water in the primary anode chamber at less than 0.2 Amp-hour/liter, and calcium ions are removed from the water in the primary cathode chamber at a substantially greater rate than magnesium ions.

In certain embodiments, the separate treated water output flows, that are combined into the conditioned water flow, include a high pH flow from the primary cathode chamber and having a pH value greater than 8.5, and a low pH flow from the primary anode chamber and having a pH value not less than 4.5.

In certain embodiments, the combined conditioned water is recirculated as the flow of feed water. In further embodiments, alkalinity is added to the conditioned water, and hydrogen gas is vented from the conditioned water.

In certain embodiments, removing cations from the water in the primary cathode chamber includes simultaneously removing calcium ions and phosphate ions.

In certain embodiments, the first electrode in the primary cathode chamber is descaled by applying a positive DC voltage to the first electrode, and scale removed from the first electrode is flushed from the primary cathode chamber. After the descaling and flushing, the pH of feed water in the primary cathode chamber is reduced by electrolysis, the pH of water in the primary anode chamber is increased by electrolysis, and cations are removed from the water in the primary anode chamber by forming scale on the second electrode in the primary anode chamber. In further embodiments, the primary anode chamber is flushed simultaneously with the primary cathode chamber during the step of flushing. In still further embodiments, a duration of performing the steps of reducing the pH of water in the primary anode chamber, and increasing the pH of water in the primary cathode chamber, before performing the step of descaling the first electrode in the primary cathode chamber, is between 10 minutes and 90 minutes. A further duration of performing the step of descaling the first electrode in the primary cathode chamber, before performing the step of flushing, from the primary cathode chamber, scale removed from the first electrode, is between 30 seconds and 300 seconds. A still further duration of performing the step of flushing, from the primary cathode chamber, scale removed from the first electrode, is between 3 seconds and 45 seconds. In still further embodiments, the flow of feed water to the electrochemical cell is stopped before descaling is performed.

In accordance with another aspect of the present invention, provided is a method of precipitating scale from water. The method includes providing an electrochemical cell. The electrochemical cell includes a primary cathode chamber including a first electrode in the primary cathode chamber, a primary anode chamber including a second electrode in the primary anode chamber, and a cation exchange membrane separating the primary cathode chamber from the primary anode chamber. Water is treated in the primary anode chamber by electrolysis. Water is also treated in the primary cathode chamber by electrolysis. The water in the primary cathode chamber includes calcium ions and magnesium ions. Treating the water in the primary cathode chamber includes removing the calcium ions from the water in the primary cathode chamber at a substantially greater rate than the magnesium ions, thereby forming calcium scale on the first electrode in the primary cathode chamber. The electrochemical cell treats the water in the primary cathode chamber and the water in the primary anode chamber at less than 0.6 Amp-hour/liter.

In certain embodiments, a flow of feed water is split into separate input flows to each of the primary cathode chamber and the primary anode chamber, and the separate input flows have substantially equal flow rates.

In certain embodiments, the water in the primary cathode chamber further includes phosphate ions, and said treating the water in the primary cathode chamber includes removing said phosphate ions.

In certain embodiments, separate treated water output flows, from each of the primary cathode chamber and primary anode chamber, are combined into a combined conditioned water flow. In further embodiments, the separate treated water output flows, that are combined into the conditioned water flow, include a high pH flow from the primary cathode chamber and having a pH value greater than 8.5, and a low pH flow from the primary anode chamber and having a pH value not less than 4.5, and the electrochemical cell treats the water in the primary cathode chamber and the water in the primary anode chamber at less than 0.2 Amp-hour/liter. In still further embodiments, the combined conditioned water is recirculated as a flow of feed water to the electrochemical cell, and the flow of feed water is split into separate input flows to each of the primary cathode chamber and the primary anode chamber, wherein the separate input flows have substantially equal flow rates.

In certain embodiments, the first electrode in the primary cathode chamber is descaled by applying a positive DC voltage to the first electrode in the primary cathode chamber and a negative DC voltage to the second electrode in the primary anode chamber. Calcium scale removed from the first electrode is flushed from the primary cathode chamber, and the primary anode chamber is flushed simultaneously. After the descaling and flushing, water in the primary anode chamber is treated by electrolysis. The water in the primary anode chamber includes calcium ions and magnesium ions, said the treating includes removing the calcium ions from the water in the primary anode chamber at a substantially greater rate than the magnesium ions, thereby forming calcium scale on the second electrode in the primary anode chamber. In further embodiments, a duration of performing the steps treating water in the primary anode chamber by electrolysis, and treating water in the primary cathode chamber by electrolysis, before performing the step of descaling the first electrode in the primary cathode chamber, is between 10 minutes and 90 minutes. A further duration of performing the step of descaling the first electrode in the primary cathode chamber, before performing the step of flushing, is between 30 seconds and 300 seconds. A still further duration of performing the step of flushing, is between 3 seconds and 45 seconds. In still further embodiments, a flow of feed water to the electrochemical cell is stopped before performing the step of descaling.

In accordance with another aspect of the invention, provided is a system for precipitating scale from water. The system includes an electrochemical cell. The electrochemical cell includes a primary cathode chamber, a primary cathode located in the primary cathode chamber, a primary anode chamber, a primary anode located in the primary anode chamber, and a cation exchange membrane separating the primary cathode chamber from the primary anode chamber. A power supply is operatively connected to the electrochemical cell to apply a voltage between the primary cathode and the primary anode. A switching device is configured to reverse polarity of the voltage between the primary cathode and the primary anode. At least one supply conduit is operatively connected to the electrochemical cell to supply feed water to the electrochemical cell. The at least one supply conduit is configured to provide separate input flows of feed water at substantially equal flow rates to each of the primary cathode chamber and the primary anode chamber. At least one combined conditioned water conduit is operatively connected to the electrochemical cell to receive and combine water output flows from each of the primary cathode chamber and the primary anode chamber, into a combined conditioned water flow.

In certain embodiments, the electrochemical cell includes a first end plate, a first gasket between the first end plate and the cation exchange membrane, a second end plate, a second gasket between the second end plate and the cation exchange membrane, and a plurality of tie rods securing the first end plate to the second end plate.

In certain embodiments, a recirculation conduit is operatively connected to recirculate combined conditioned water as the feed water. A reservoir receives and stores the combined conditioned water, received from the at least one combined conditioned water conduit.

In certain embodiments, the electrochemical cell and the power supply are configured to treat water in the primary cathode chamber and water in the primary anode chamber at less than 0.2 Amp-hour/liter by a DC current flow between the primary cathode chamber and the primary anode chamber, and remove calcium ions from the water in one of the primary cathode chamber and the primary anode chamber at a substantially greater rate than magnesium ions. In further embodiments, the calcium ions are removed from the water as calcium scale formed on one of the primary cathode and the primary anode, and the calcium scale formed on said one of the primary cathode and the primary anode is automatically descaled by operation of the switching device reversing the polarity of the voltage between the primary cathode and the primary anode.

In certain embodiments, the water output flows include a first water output flow having a pH value greater than 8.5, and a second water output flow having a pH value not less than 4.5.

A fuller understanding of these and other aspects and embodiments of the invention will be had from the following description of the invention and the appended drawings.

DETAILED DESCRIPTION

Figure 1:
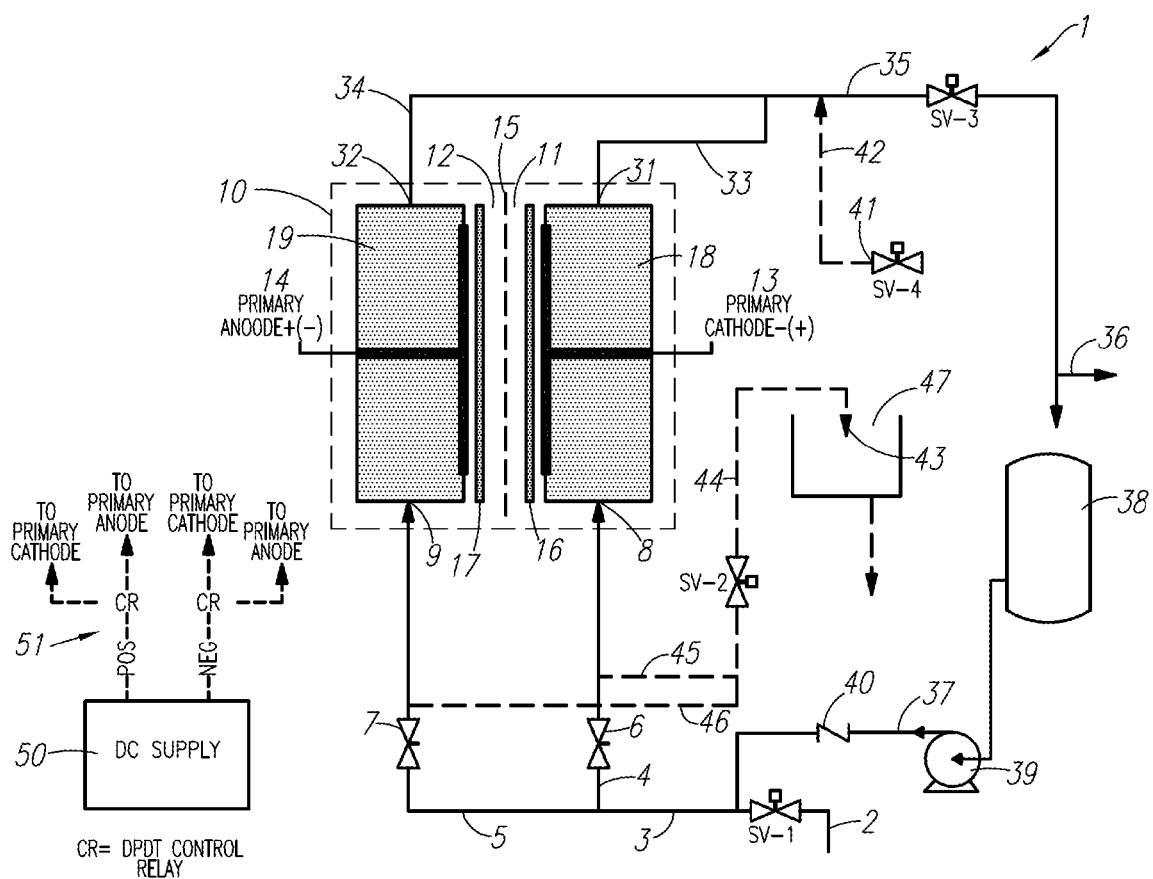
FIG. 1 is a schematic representation showing the components of an apparatus according to an embodiment of the invention.

Disclosed is an apparatus, method and system for reducing the concentration of hardness ions, principally calcium, in water. FIG. 1 shows the apparatus 1 according to a preferred embodiment of the present invention. The main components of the preferred embodiment are an electrochemical cell 10, a direct current (DC) power supply 50, a polarity reversing relay 51, a flush system, a reservoir 38, and a recirculation pump 39. The following will provide a more detailed description of the apparatus of the preferred embodiment.

The apparatus has an influent water inlet 2, wherein untreated water will initially enter the apparatus. Connected to the inlet 2 is conduit 3, along which a first solenoid valve SV1 is located. SV1 controls the flow of untreated water into the apparatus. Conduit 3 is connected to conduits 4 and 5 such that water (e.g., feed water) entering conduits 4 and 5 from conduit 3 is preferably split into two approximately equal volumes. To assist in balancing the flow of water through conduits 4 and 5, flow controls 6 and 7, respectively, can be added. Suitable flow controls include, but are not limited to, valves or orifices having an opening with a defined diameter. Because flow rate depends, in part, upon the size of the opening, different diameter openings can be used depending on the desired flow rate. However, the flow rate through the flow controls 6 and 7 is typically lower than the typical unrestricted flow rate of the influent water through the inlet 2 so that the flow rate through the apparatus remains relatively constant while the system is in operation.

Conduits 4 and 5 are connected to electrode chambers 11, 12 of the electrochemical cell 10. More specifically, conduit 4 is connected through inlet 8 to electrode chamber 11 which, in the embodiments shown, serves as the primary cathode chamber. Conduit 5 is connected through inlet 9 to electrode chamber 12 which, in the embodiments shown serves as the primary anode chamber. Water entering the primary cathode chamber 11 through inlet 8 can exit the chamber through outlet 31. Similarly, water entering the primary anode chamber 12 can exit the chamber through outlet 32.

Figure 2:
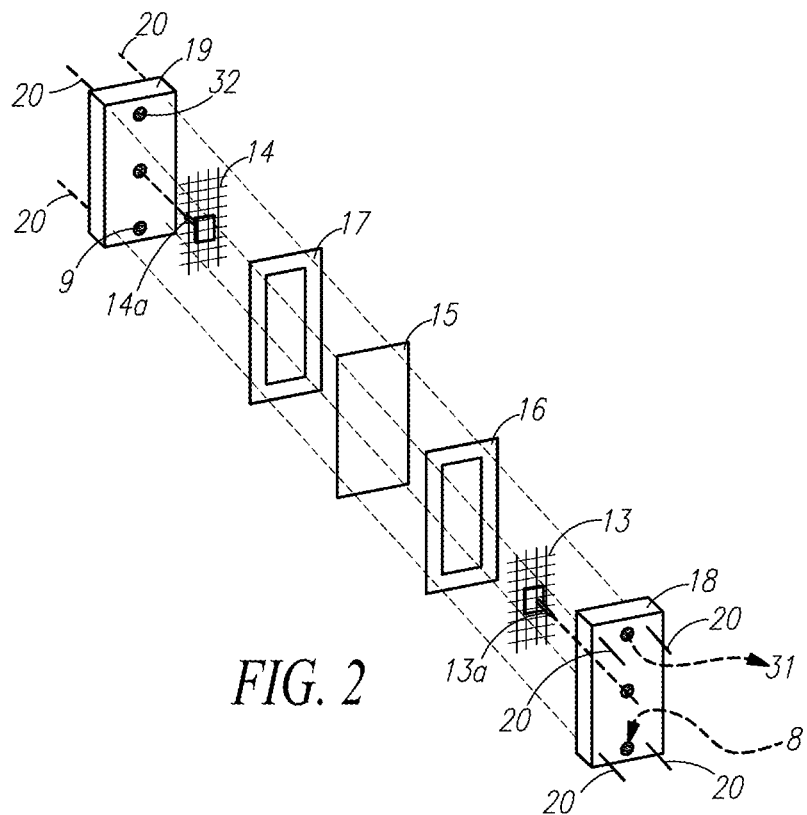
FIG. 2 is an exploded view of an electrochemical cell in accordance with an embodiment of the invention.

With respect to the electrochemical cell 10, as noted above and as also shown in FIG. 2, the cell 10 includes an electrode chamber 11, shown as the primary cathode chamber, and an electrode chamber 12, shown as the primary anode chamber. With reference to FIG. 2, the primary cathode chamber 11 contains electrode 13, which is a first electrode and operative as the primary cathode and is connected to a direct current source (FIG. 1) via electrical contact 13a. The primary anode chamber 12 contains electrode 14, which is a second electrode and operative as the primary anode and is connected to a direct current source via electrical contact 14a. Each of the electrode chambers 11, 12 is respectively defined by an end plate 18, 19, a gasket 16, 17, and a cation exchange membrane ("CEM") 15. The CEM 15 separates and forms a common boundary between the two electrode chambers 11, 12. Attached to the CEM 15 on each side are gaskets 16, 17. The gaskets 16, 17 contain a central open area that is sized to accommodate the electrodes 13, 14. Finally, each chamber is bounded on the opposite side of the CEM by an inside face of an end plate 18, 19, which each have a milled out recessed area wherein the electrodes 13, 14 are mounted, respectively. Tie rods 20 extend through the corners of each of the end plates 18, 19 and are used to hold the electrochemical cell 10 together.

In a preferred embodiment, the electrodes 13 and 14 are each capable of taking on a positive or a negative charge. Accordingly, they will preferably comprise the same material. Suitable materials for the electrodes include, but are not limited to, platinum, platinum plated niobium, and titanium coated with a catalytic coating of iridium oxide, ruthenium oxide, or mixed metal oxides. Other noble metal coated materials are also contemplated. The preferred electrode material is iridium or mixed metal oxide coated titanium, such as those made by Water Star Incorporated in the United States and Heraeus in Germany. These and other materials suitable for use as electrodes in accordance with the invention will be apparent to those of ordinary skill in the art in view of the instant disclosure.

Suitable gasket material is any type of rubber that is semi-tolerant to chlorine and to the other conditions it will encounter in the apparatus. Examples, for the purpose of illustration and not limitation, include EPDM, santoprene, and silicone rubber. EPDM is preferred due to its low cost and availability. These and other materials suitable for use as gaskets in accordance with the invention will be apparent to those of ordinary skill in the art in view of the instant disclosure.

Suitable cation exchange membranes may either be heterogeneous where ground up ion exchange resins mixed with a polymeric binder and reinforcing fabric are made into sheets, or they may be homogeneous, where they are monomers or novolac resins that are already functionalized and cast into sheet form, either with or without reinforcing fabric. Any cation exchange membrane with strong acid functionality and, if present, a reinforcing fabric that is compatible with the pH extremes it may see in service will work in this apparatus. The preferred cation exchange membrane is heterogeneous with very low water permeability, strong acid functionality and a reinforcing fabric, such as those made by Mega Corporation in the Czech Republic or Membranes International in the United States. Examples of suitable homogeneous membranes are those made by Astom Corporation in Japan under the tradename Neosepta, and membranes made by Fumatech GmbH in Germany under the tradename Fumasep. Those of ordinary skill in the art will be able to select and implement suitable CEMs for use in accordance with the invention in view of the instant disclosure.

Returning to FIG. 1, water exiting the primary cathode chamber 11 via outlet 31 will enter conduit 33, and water exiting the primary anode chamber 12 via outlet 32 will enter conduit 34. Conduits 33 and 34 are connected to outlets 31 and 32, respectively, on one end and to conditioned water conduit 35 on the other end. Conduits 33 and 34 converge to combine the water treated in each of the electrode chambers 11 and 12 into one conditioned water stream at conduit 35. In accordance with the preferred embodiment of FIG. 1, conduit 35 will transport the conditioned water to either the system outlet (not shown) via conduit 36 or to a reservoir 38. Additionally, solenoid valve SV3 is located along conduit 35 and is used to control the flow of water through conduit 35.

With respect to the reservoir 38, in a preferred embodiment, the reservoir is a pressurized tank containing a pressurized rubber bladder that keeps water flowing as the pressure drops. One example of a suitable pressurized reservoir is a composite water storage tank supplied by Wellmate. However, one of ordinary skill in the art will be able to select and implement a suitable reservoir for use in accordance with the invention in view of the instant disclosure.

Connected to the reservoir 38 via recirculation conduit 37 is recirculation pump 39, which operates to circulate water through the system even when untreated water is no longer being fed to the influent water inlet 2. If water is to be recirculated rather than sent directly to use, it will first enter the reservoir 38 and eventually pass through to recirculation conduit 37. Recirculation conduit 37 will transport the conditioned water to conduit 3 so that the water can be sent back through the electrochemical cell 10. Located along recirculation conduit is check valve 40, which operates to prevent water from flowing in the opposite direction. As shown, recirculation conduit 37 is connected to conduit 3 at a point along conduit 3 that is downstream of SV1.

Recirculation pumps for use in accordance with the embodiments are available commercially and those of ordinary skill in the art will be able to select and implement a suitable recirculation pump for use in accordance with the invention in view of the instant disclosure.

In another aspect of the invention, the apparatus also includes a system flush inlet 41 and a system flush outlet 43. In the embodiment shown, the system flush inlet 41 is connected to the conditioned water conduit 35 via system flush conduit 42. Conduit 42 is connected to conduit 35 between SV3 and the point at which conduits 33 and 34 diverge. As will be described in more detail below, conduit 42 is used to transport water to the apparatus for the purpose of flushing scale from the electrochemical cell. Located along conduit 42 is solenoid valve SV4. SV4 is used to control the flow of water through system flush inlet 41.

The system flush outlet 43 is connected to conduits 45 and 46 via system flush conduit 44. Conduit 45 is connected to conduit 4 between flow control 6 and the inlet 8. Conduit 46 is connected to conduit 5 between flow control 7 and the inlet 9. Conduits 44, 45, and 46 carry water from conduits 4 and 5 to either a settling tank 47 or to a drain (not shown) via outlet 43. The settling tank 47 can be used to collect the solids present in the flush water while allowing the overflow water to be or sent to the drain. Of course, if one wanted to recirculate the flush water through the system after settling, a repressurization step would need to be added.

The apparatus also includes a control unit (not shown), a direct current power supply 50, and a polarity switching relay 51. Low and high pressure switches for detecting the presence or absence of water being added to the system are inputs to the controller. The DC power supply 50, polarity switching relay 51, recirculation pump 39, and solenoid valves SV1, SV2, SV3, and SV4 are outputs. The DC power supply 50 is connected to the polarity switching relay 51. Preferably, the polarity switching relay is a double pole double throw relay. One of ordinary skill in the art will be able to select and implement a suitable DC power supply, polarity switching relay, and other controls and control electronics for use in accordance with the invention in view of the instant disclosure.

In operation, the concentration of hardness ions, principally calcium, in water is reduced. For reference, according to the AWWA in their Water Quality and Treatment Handbook (published by the American Water Works Association, fourth edition, 1990), total hardness is often defined as the sum of the concentrations of the divalent cations of calcium and magnesium, and is usually expressed in terms of mg/L as $CaCO_3$. Typically, calcium accounts for 75% of the total hardness. The AWWA also provides the following categorizations based on the total hardness of the water:

| Hardness Range (mg/L as $CaCO_3$) | Hardness Description |
|---|---|
| 0-75 | Soft |
| 75-150 | Moderately Hard |
| 150-300 | Hard |
| >300 | Very Hard |

The method and apparatus disclosed herein for residential applications can process between about 100 to about 300 gallons per day (1,135 L/day) of untreated water with a starting concentration of from about 7.5 to about 15 Grains per gallon (128-256 mg/L) of calcium hardness, or from about 10 to about 20 Grains per gallon (171-342 mg/L) of total hardness, and should be capable of reducing the hardness by at least about 9 Grains per gallon of calcium hardness. For reference, total hardness is often defined as the sum of the concentrations of the divalent cations of calcium and magnesium, and is usually expressed in terms of mg/L as $CaCO_3$. Larger volumes and/or higher concentrations can also be accommodated by providing a proportionally larger electrochemical cell and DC power supply or by adding more electrochemical cells to the system. Smaller volumes and/or lower concentrations can also be accommodated by providing a proportionally smaller cell, running the cell at lower amperage, or operating the apparatus for fewer hours per day. The preferred option is to run the cell for fewer hours per day, unless the hardness concentration and flows are less than 50% of the values stated. One of ordinary skill in the art will be able to configure the apparatus to achieve sufficient removal of hardness ions to meet any desired daily demands in view of the instant disclosure.

In the preferred embodiment, the apparatus will have three different operating steps: a soften step in which the concentration of hardness ions is reduced (mainly $Ca^{2+}$), a descale step in which the scale is automatically removed from the electrode surface, and a flush step in which the scale and other sediment is flushed from the electrode chambers and apparatus. Alternatively, more or less steps can be used in accordance with the invention.

In operation, the end user will request water from a source such as the faucet of a kitchen sink. As water is removed from the faucet, the pressure drops. The drop in pressure sends a signal to the control unit, which then causes SV-1 to open and the recirculation pump 39, DC power supply 50, polarity switching relay 51, and other appropriate solenoid valves to operate.

During the soften step, SV1 and SV3 will be in the open position to allow for water to flow through the apparatus, while SV2 and SV4 will remain closed to prevent water from flowing through the system flush inlet 41 and the system flush outlet 43.

The DC power supply 50 will supply a negative charge to one of the electrodes and a positive charge to the other electrode. In operation, the two electrodes will always possess an opposite charge and, in a preferred embodiment, the polarity of the electrodes can be reversed. During at least the first soften step, the polarity switching relay directs a negative charge to the primary cathode 13 and a positive charge to the primary anode 14. When a negative charge is applied to one of the electrodes, it becomes the cathode, and when a positive charge is applied to one of the electrodes, it becomes the anode. Thus, when the polarity switching relay 51 reverses the polarity and a negative charge is delivered to the primary anode 14, the electrode becomes the secondary cathode 14. Similarly, when a positive charge is delivered to the primary cathode 13, the electrode becomes the secondary anode 13.

Figure 3:
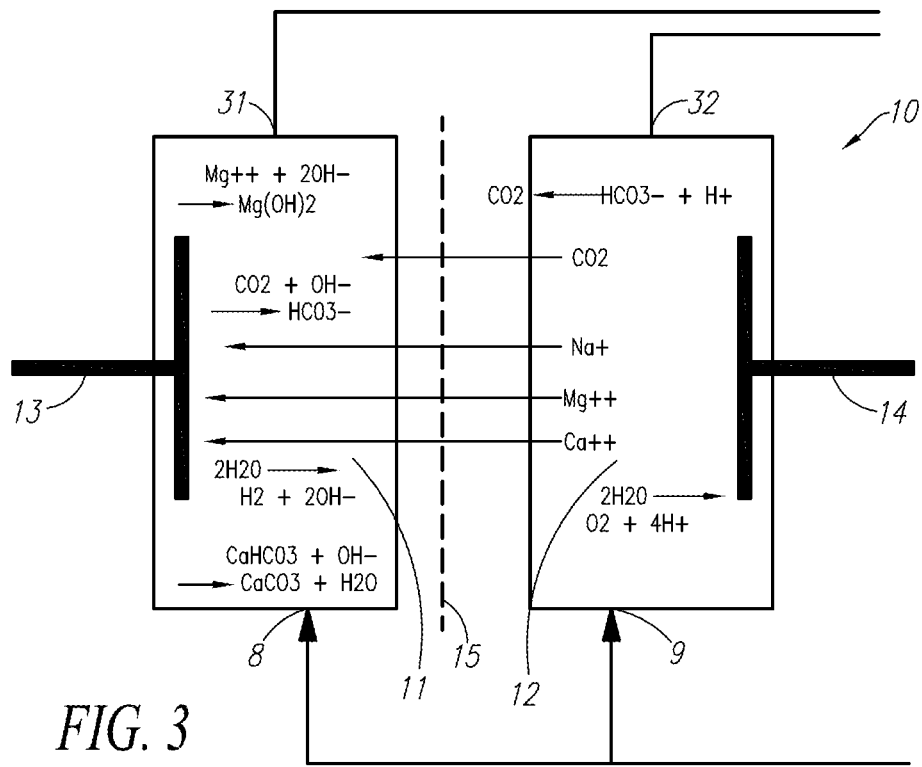
FIG. 3 is a schematic representation of an electrochemical cell in accordance with an embodiment of the invention depicting several reactions that take place inside the cell.

Once the water passes through SV1, it will continue through conduit 3 until it reaches conduits 4 and 5. At that time, the water will be split into two approximately equal volume streams that will travel along conduits 4 and 5 into electrode chambers 11 and 12, respectively. Accordingly, when the influent water enters into the primary cathode chamber 11 and the primary anode chamber 12, reactions take place at the electrodes 13 and 14 and in the solution within the chambers 11 and 12. In addition, there is movement of ions and non-ionic $CO_2$ across the CEM 15. Several of these reactions are illustrated in FIG. 3 and are described in further detail below. For the purpose of illustration and not limitation, in FIG. 3 and in the description of the soften step below, the polarity of the primary cathode 13 is negative and the polarity of the primary anode 14 is positive.

In the primary anode chamber 12 there is electrolysis of water at the anode 14. The principal reaction is the production of oxygen gas and hydrogen ions as shown in the following equation.

$$2H_2O - 4e^- \rightarrow O_2 + 4H^+$$

At the same time, the applied DC current moves dissolved cations such as sodium, calcium and magnesium ions across the CEM 15 from the primary anode chamber 12 into the primary cathode chamber 11. Water leaving the primary anode chamber 12 is thereby reduced in sodium, calcium and magnesium ion concentrations and enriched in hydrogen ion, as evidenced by a reduction of the pH in the water leaving the primary anode chamber 12 as compared to the influent water.

In the primary cathode chamber 11, when there is flow and DC current is applied, the concentration of non-hydrogen cations increases as a result of cations which have passed through the cation exchange membrane 15 from the primary anode chamber 12. The principal cathode reaction is the production of hydrogen gas and hydroxyl ions as shown in the following equation.

$$2H_2O + 2e^- \rightarrow H_2 + 2OH^-$$

Both the enrichment of hardness ions in the primary cathode chamber 13 and the elevation of the pH due to the production of hydroxyl ions created from the electrolysis of water result in a super-saturated solution with respect to calcium and magnesium. The precipitation of calcium depends upon the presence of dissolved carbon dioxide and/or bicarbonate ion.

Dissolved carbon dioxide and bicarbonate ions are universally present in water supplies that are not acidic and are also produced by reactions in the anode and cathode chambers, respectively. Due to the lower pH in the anode chamber, bicarbonate ions are converted to non-ionic dissolved carbon dioxide, as shown by the following equation.

$$HCO_3^- + H^+ \rightarrow H_2CO_3 \rightarrow H_2O + CO_2$$

The dissolved carbon dioxide then leaves the anode chamber and moves across the membrane to the cathode chamber. Once the carbon dioxide is in the cathode chamber, the higher pH converts it to the bicarbonate ion, as shown in the following equation. This conversion enriches the supply of the bicarbonate ion in the cathode chamber and promotes calcium carbonate precipitation.

$$CO_2 + OH^- \rightarrow HCO_3^-$$

With respect to the precipitation of calcium and magnesium, the electrolysis of water at the cathode produces OH– ions which react with calcium and bicarbonate ions to form insoluble calcium carbonate and with magnesium ions to form insoluble magnesium hydroxide. The following equation shows the primary calcium precipitation reaction.

$$Ca^{++} + HCO_3^- + OH^- \rightarrow CaCO_3(s) + H_2O$$

The precipitation of magnesium is primarily by the formation of insoluble magnesium hydroxide, as shown in the following equation.

$$Mg^{++} + 2OH^- \rightarrow Mg(OH)_2(s)$$

In the process of precipitation of these ions, ions such as silica, iron, and others, if present, may also be reduced in concentration.

A further feature of this invention is the conversion of some of the chloride ions, if present in the influent water, into chlorine at the anode, which rapidly hydrolyzes into hypochlorous acid as shown in the following equations.

$$2Cl^- - 2e^- \rightarrow Cl_2$$

$$Cl_2 + OH^- \rightarrow HOCl + Cl^-$$

This is the same form of chlorine that is used for the disinfection of potable water. So, in addition to reducing the concentration of hardness and possibly other ions, this invention can also provide protection from water born, disease-causing organisms.

To determine how the efficiency of hardness removal varied with the feed hardness concentration and how various water parameters, such as conductivity and pH, changed in this process, several tests were done using a system with a reservoir and a pump that continuously recirculated water from the reservoir through the cell and back to the reservoir. With respect to the materials of the electrochemical cell, the electrodes were made of iridium oxide coated titanium expanded metal manufactured by Water Star Inc., the CEM was manufactured by Ionac Corporation, now part of Lanxess AG, and the gaskets were composed of silicone rubber. The results are shown in Table 1.

TABLE 1

| Amp-Hr/Liter | pH | COND. uS | ALK. as CaCO3 | Ca$^{2+}$ as CaCO3 | Mg$^{2+}$ as CaCO3 |
|---|---|---|---|---|---|
| 0 | 7.32 | 646 | 262.4 | 91 | 24.75 |
| 0.05 | 7.46 | 598 | 229.6 | 80 | 24 |
| 0.1 | 7.62 | 588 | 225.5 | 77 | 23.75 |
| 0.21 | 7.28 | 544 | 200.9 | 64.75 | 23.25 |
| 0.35 | 7.25 | 462 | 139.4 | 44 | 22.25 |
| 0.63 | 6.91 | 389 | 86.1 | 28 | 20.5 |
| 1.23 | 6.08 | 291 | 16.4 | 9.25 | 16.75 |
| 1.49 | 3.2 | 418 | — | 7.0 | 9.25 |
| 2.02 | 3.04 | 497 | — | .0 | 3.75 |

Figure 6:
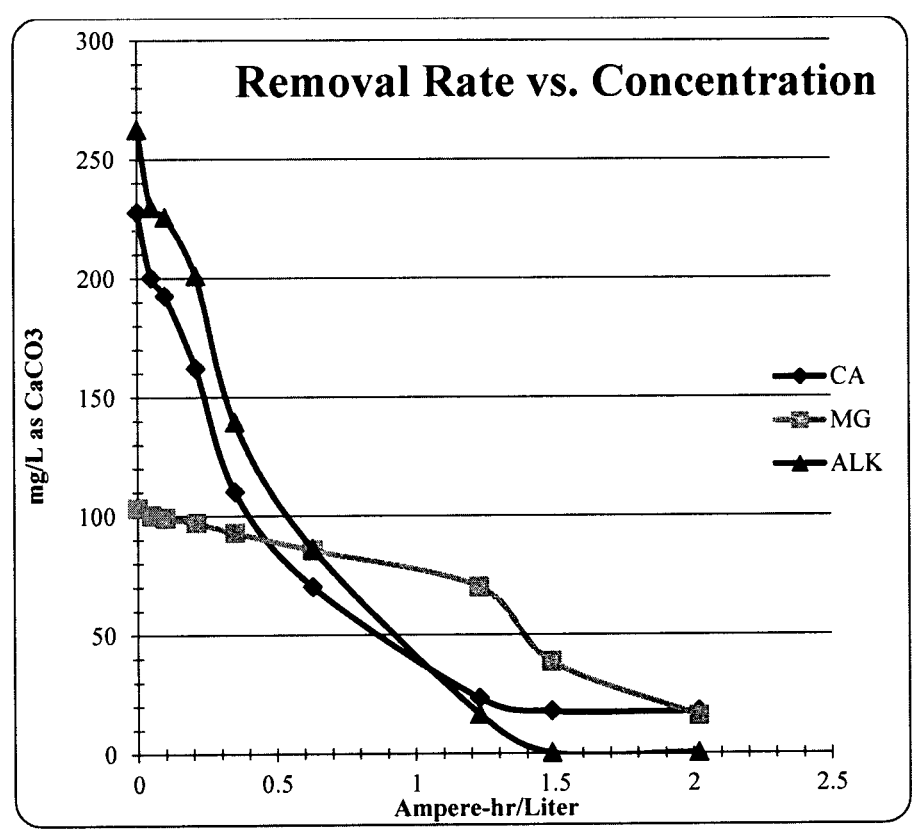
FIG. 6 shows a chart plotting data from Table 1.

This is shown graphically in FIG. 6. Several conclusions were drawn from this data. First, it can be seen that the calcium and alkalinity are removed in preference to magnesium, initially, and in a 1:1 molar ratio. The data also shows that there is an upper limit to how far that a system of this type can remove hardness based upon the amount of alkalinity remaining in the water. Once the alkalinity falls below about 80 mg/L, the pH of the water is reduced below acceptable levels for domestic use (6.5-8.5 per the EPA Secondary Standard) and the water becomes corrosive. The data also demonstrates that the Total Dissolved Solids concentration is reduced, as evidenced by the drop in conductivity.

With respect to the efficiency of the system, as the concentrations of calcium and alkalinity are reduced, the efficiency of their removal is reduced rapidly. In other words, at lower concentrations of calcium and alkalinity, it takes more work (more amp-hrs per liter) to remove each successive mg/L. Based on the data generated, it appeared that the optimal amount of amp-hr/L for this test water, in terms of efficiency, was <0.6 amp-hr/L and probably significantly lower.

Based upon the results from the tests above, new tests were run to study the effects of operating at lower amp-hr/L. Similar to above, the new tests were run on a system with a reservoir and a pump that continuously recirculated water from the reservoir through the cell and back to the reservoir. The materials of the electrochemical cell are identical to those identified above. The results are shown in Table 2.

TABLE 2

| Amp-Hr/L | pH | Alk. as CaCO3 | $Ca^{2+}$ as CaCO3 | $Mg^{2+}$ as CaCO3 |
|---|---|---|---|---|
| 0 | 7.73 | 240 | 223.8 | 102.8 |
| 0.162 | 6.72 | 108 | 90 | 96.6 |
| 0.324 | 6.63 | 80 | 57.5 | 93.5 |
| 0.485 | 6.69 | 60 | 46.25 | 94.5 |

Figure 7:
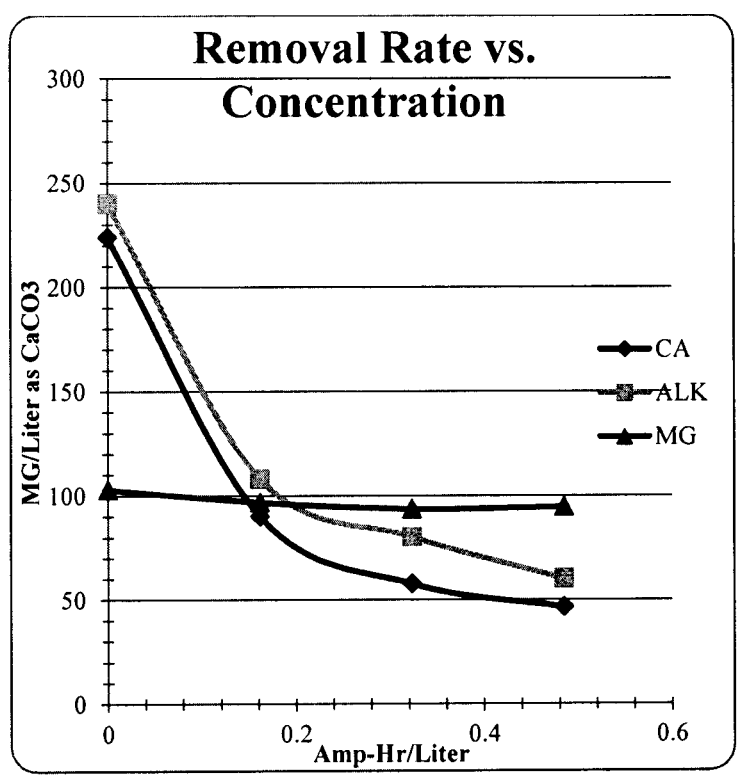
FIG. 7 shows a chart plotting data from Table 2.

This is shown graphically in FIG. 7.

The data confirms the conclusions drawn from the results of the initial set of tests. Furthermore, it is readily evident that there is almost no removal of magnesium at this level, which can be beneficial to health due to the fact that magnesium deficiency has been linked to heart disease and high blood pressure. Moreover, it is also evident from the data that the reduction in removal efficiency as the concentration drops is even more significant than was shown in the previous test. Optimal efficiency for the water tested appears to be <0.2 amp-hrs per Liter. Based on the results of these tests, the operating parameters of the present invention, especially with respect to optimal efficiency, were developed.

Referring back to the operation of the method and apparatus according to the present disclosure, the amount and type of scale formation is dependent, in part, on the amperage in relation to the flow rate. If the flow rate is too low in relation to the amperage, then the primary cathode 13 is not being supplied with calcium at a fast enough rate to keep up with the OH– ions being generated at the primary cathode 13. In this case, the pH in the primary cathode chamber 11 liquid will rise higher than desired, and the precipitation will take place before calcium can reach the primary cathode 13 instead of at the more desirable location: the primary cathode 13 itself. At a low flow rate relative to the amperage, this precipitation takes the form of a fluffy precipitate floc that settles very slowly and will be carried out of the cell 10 and would require a settling chamber (not shown) and/or filter (not shown) to separate the precipitate from the water.

By contrast, when the precipitate forms on the primary cathode 13, it tends to form a denser, crystalline precipitate that, when dislodged from the electrode, settles very rapidly in comparison to the floc type of precipitate. In this case, the precipitate is not carried through the system and once dislodged, as will be described in further detail below, the solids can be simply flushed to a drain or settled in a much smaller settling chamber, and no filter is required.

With respect to maximum flow rates, too high of a flow rate relative to the applied amperage is also undesirable because it dilutes the OH– concentration in the primary cathode chamber 11. If that happens, the precipitation reaction will be slowed and some of the precipitate may re-dissolve.

As will be apparent from the foregoing, the flow rate versus the applied amperage also determines the pH in each chamber. In the primary anode chamber 12 if the flow rate relative to the amperage is too low, then the hydrogen ion concentration rises dramatically, and since hydrogen ions are cations and diffuse several times faster than any other cation present in the solution, they are transported across the membrane 15 in preference to sodium, calcium and magnesium. Transport of hydrogen ions across the membrane 15 to the primary cathode chamber 11 also reduces the pH there and inhibits the precipitation reaction. Both of these effects are undesirable.

For these reasons, the flow, which is preferably the same in each chamber, and the amperage, which must be the same in each chamber, as configured, has to be balanced to some extent. Typical minimum flow rates are tied to the amperage and are preferably about 200 mL per minute (100 per side) at a current of 1.0 ampere. Preferably, a maximum flow rate would be about three times the minimum rate. Furthermore, in the preferred embodiment, the flow rate is constant, except when water is added to the recirculation conduit 37 to replace water that is withdrawn from the reservoir 38. For these brief periods the flow will be slightly higher, but still restricted by the flow controls 6 and 7. Moreover, the actual effect of flow and current on the pH in each chamber will vary somewhat with the composition of the influent water, and also depend upon how much calcium has already been removed from the water. However, during normal operation it will stay in the desired ranges elaborated upon below.

With respect to amperage, to obtain optimal hardness reduction in a residential application, the cell should be capable of operating at 0.11 ampere-hours per liter (amp-hr/L). Accordingly, following the equations below, at a daily volume of 1,135 L, the cell should be capable of operating at greater than 5.68 amperes.

0.11 amp-hr/L×1,135 L/day=124.9 amp-hours/day, rounded to 125

125 amp-hr/day÷22 hours per day of operation (representing continuous operation and allowing time for the descale and flush steps)=5.68 amperes Thus, in a typical residential system for hard water operating at 5-6 amperes, a minimum flow rate of about 1 L/min to about 1.2 L/min (half to each side) would be preferable.

To regulate and balance the amperage to the flow rate, pH measurements of the water leaving each chamber can be used. While this could be monitored and used for automatic adjustment of the amperage, in practice, it is not necessary. Once set, and at constant flow rate, the amperage does not need to be adjusted unless there is a very significant change in the composition of the feed water. The pH can easily be measured at start-up with a portable meter, or pH indicator paper, and the amperage adjusted accordingly. Preferably, the pH of the water leaving the cathode chamber is greater than 8.5 and the pH of the water leaving the anode chamber is not less than 4.5. Of course, the apparatus can be configured to include flow and pH meters and one of ordinary skill in the art would be able to implement them in accordance with the instant disclosure.

When operating at a lower or higher amperage to accommodate different applications, the minimum flow rate should be decreased or increased accordingly. One of ordinary skill in the art will be capable of adjusting the amperage and flow rate to accommodate different applications in view of the instant disclosure.

Also tied to the amperage is the surface area of the CEM 15 and the electrodes 13 and 14. Taking into account that the cell in this residential application has a useful current density operating range of about 5 to about 30 ma/cm² and is capable of operating at least 5.68 amperes, following the equation below, the CEM 15 and electrodes 13 and 14 should preferably have an area of at least about 284 cm² using the midpoint current density operating value of 20 ma/cm2.

5,680 ma÷20 ma/cm²=284 cm²

Those of ordinary skill in the art will be able to adjust the surface area for different applications by taking into account the amperage and useful current density operating range in view of the instant disclosure.

Returning to FIG. 1, while reactions are taking place within the electrochemical cell 10, water will continue to move through the primary cathode chamber 11 and primary anode chamber 12. The water in the primary cathode chamber 11 will pass through the outlet and into conduit 33 while the water in the primary anode chamber 12 will pass through the outlet and into conduit 34. Subsequently, the two water streams will be combined into one conditioned water stream at conduit 35.

As noted above, in a preferred embodiment, the conditioned water stream can be sent directly to use or to be recirculated through the electrochemical cell 10. When the conditioned water stream is to be sent directly to use, it will flow from conduit 35 to the system outlet conduit 36 and subsequently the system outlet (not shown).

When the conditioned water stream is to be recirculated, it will continue to flow through conduit 35 until it reaches the reservoir 38. In operation, pressure switches are used to regulate the pressure and consequently, the level of water, in the reservoir. As water leaves the system, the bladder begins to shrink in size and the pressure drops. After a certain amount of water has left the reservoir, the pressure will reach a certain lower threshold level, about 30 psi, thus activating a pressure switch which will direct water to fill the reservoir until the pressure reaches an upper threshold level, preferably about 50 psi, indicating that the reservoir 38 is full.

Water leaving the reservoir 38 will be directed through recirculation conduit 37 where it will pass through recirculation pump 39. In operation, the pump will start whenever untreated influent water is added (at low pressure) and will continue to run for a set duration after the addition of influent water has stopped (at high pressure), with the exception that the pump will preferably be off during the descale step. The duration is a pre-set value that can be adjusted based on the hardness of the untreated water and will be described in more detail below. Furthermore, the system will run when the pump runs and will go into standby mode when the pump shuts off, with the exception that the system can continue to run when the pump is off during the descale step.

After water has passed through the recirculation pump 39, it continues to flow through conduit 37 until it reaches conduit 3. Once in conduit 3, the recycled water will be sent through the apparatus to be treated again, as described previously.

As water is circulated through the electrode chambers during the soften step, scale begins to form on the primary cathode 13. To avoid the need to manually clean the scale off of the electrode 13, the system has been designed for automatic descaling. During the descale step, SV1 is preferably closed to prevent the flow of untreated influent water into the apparatus, while SV3 is preferably left open. As with the soften step, SV2 and SV4 remain closed. Additionally, the recirculation pump 39 can be on or off during this step, but is preferably off. When the pump is in the "off" position during this step, descaling occurs at a much faster rate.

To descale the cathode, relay 51 reverses the polarity from the DC power supply to the electrodes and supplies a negative charge to the primary anode 14 and a positive charge to the primary cathode 13. The positive charge being delivered to the primary cathode 13 produces an acidic environment at the electrode surface. The acidity undercuts the scale that adhered to the surface of the electrode during the soften step, causing the scale to flake off. As noted previously, because the scale forms a dense, crystalline precipitate, it settles to the bottom of the chamber primary cathode chamber 11 very rapidly once dislodged from the electrode 13.

After the primary cathode 13 has been descaled, the scale and other sediment will be removed from the apparatus via a flush step. During the flush step, SV1 and SV3 are closed to prevent water from entering the apparatus at inlet 2 and from being recycled or sent directly to use. Additionally, SV2 and SV4 are open to allow water to flow through system flush inlet 41 and system flush outlet 43.

To flush the scale from the primary cathode chamber 11 in the preferred embodiment, untreated influent water ("flush water") is introduced to the apparatus through the system flush inlet 41. The flush water continues through conduit 42 and into conduit 35 in the opposite direction of the flow during the soften step, splits into two roughly equal volume streams via conduits 33 and 34, and enters the primary cathode chamber 11 and primary anode chamber 12 via the outlet 31 and outlet 32, respectively. The two streams will continue to flow through their respective electrode chambers 11 and 12 and exit the chambers 11 and 12 through inlet 8 and inlet 9, respectively. While flush water can be run solely through the electrode chamber that has just been descaled, it is preferably run through both chambers at the same time. By running the flush water at equal pressure through both electrode chambers rather than running water through only one chamber, undue stress to the CEM 15 can be avoided. As one stream of flush water runs through the primary cathode chamber 11, it will clear the scale that settled in the primary cathode chamber 11 during the descale cycle.

After exiting the electrode chambers 11 and 12, the two streams continue along conduits 4 and 5 until they reach conduits 45 and 46, respectively. Water is prevented from flowing back through the system via the remaining length of conduits 4 and 5 and conduits 3 and 37 because SV-1 is closed during the flush cycle and check valve 40 prevents the flow of water in the reverse direction. Thus, the streams will enter conduits 45 and 46 and will continue along the conduits until they merge into one stream at conduit 44. Flush water will flow through conduit 44 until it reaches the system flush outlet 43. If the apparatus includes a settling tank 47, the flush water will flow into the settling tank 47 from the system flush outlet 43. As flush water flows through the tank 47, scale that was cleared from the primary cathode 11 will settle to the bottom of the tank 47. The scale will eventually be sent to a drain or disposal.

Once the scale has been flushed from the apparatus 1, the system flush step ends and the soften step will begin again. The apparatus will continue to cycle through the steps in the order presented above. In the preferred embodiment, the polarity of the electrodes 13 and 14 will switch every soften step. For example, if the primary cathode 13 carried a negative charge for the previous soften step, it will carry a positive charge for the next soften step. It will be understood that the soften step in which the polarity of the electrodes is switched (e.g., the primary cathode—or secondary anode—13, carries a positive charge and the primary anode—or secondary cathode—14, carries a negative charge) will operate in the same manner and generate the same reactions as the step described above (e.g., the primary cathode 13 carries a negative charge and the primary anode 14 carried a positive charge), except that the reactions at each electrode will be reversed and scale will form on the primary anode 14, or secondary cathode.

The same concept holds true for the descale step. When the polarity is reversed, the descale step will operate in the same manner as described above, except that the charges delivered to the electrodes 13 and 14 are switched and scale is removed from the secondary cathode 14, rather than the primary cathode 13.

With respect to the timing of the steps, in the residential application of the invention, the duration of the soften step can be from about 10 to about 90 minutes, and preferably from about 15 to about 20 minutes. The descale step need only run for a short duration in comparison to the soften step, due to the fact that the polarity reversal of electrodes causes the scale to be undercut almost instantaneously. The duration of the descale step can be from about 30 to about 300 seconds, and preferably from about 30 to about 60 seconds. As with the descale step, the scale can be flushed from the apparatus during the flush step in a relatively short duration compared to the soften step. The duration of the flush step can be from about 3 to about 45 seconds, and preferably from about 5 to about 30 seconds and is dependent on the water pressure and how long it takes to flush all of the scale from the apparatus.

In addition to setting the duration of the steps, the duration of time that the recirculation pump 39 runs after the flow of influent water to inlet 2 has stopped should also be set. Preferably, the duration is from 1 to 60 minutes. Generally, the duration should be long enough to allow for the water to make a second pass through the electrochemical cell 10. However, when the initial hardness level is higher, more soften cycles may be needed to achieve the desired degree of hardness removal.

In one aspect of the invention, the system can include adjustable timers for timing the length of the steps and the amount of the time the pump will run after influent water has stopped flowing. It will be apparent to one of ordinary skill in the art that the duration ranges provided above can be adjusted depending on the application. For instance, in applications where the initial hardness level is higher, one can either increase the duration of the soften step or increase the duration of time that the pump runs after influent water has stopped flowing (e.g. allowing more soften cycles to be achieved). Preferably, the duration of time that the pump runs is increased, thus allowing for more soften cycles.

A second embodiment of the invention is described with reference to FIG. 4. The primary differences between the apparatus of this embodiment and the apparatus 1 in the first embodiment are that a magnesium oxide media filter 71 and a gas valve vent 72 have been added. Additionally, with respect to the soften step, the paths that the conditioned water can take after it has reached conduit 35 have been reconfigured.

With respect to the gas vent valve 72, many reactions take place as water progresses through the electrode chambers 11 and 12, some of which produce hydrogen gas. Over time, there is a build-up of hydrogen gas and it becomes necessary to release some of this gas. Accordingly, the vent is present to affect the release of hydrogen gas from the apparatus. Care should be taken to vent to a well-ventilated area such as outdoors where air will rapidly dilute the hydrogen concentration.

Figure 5:
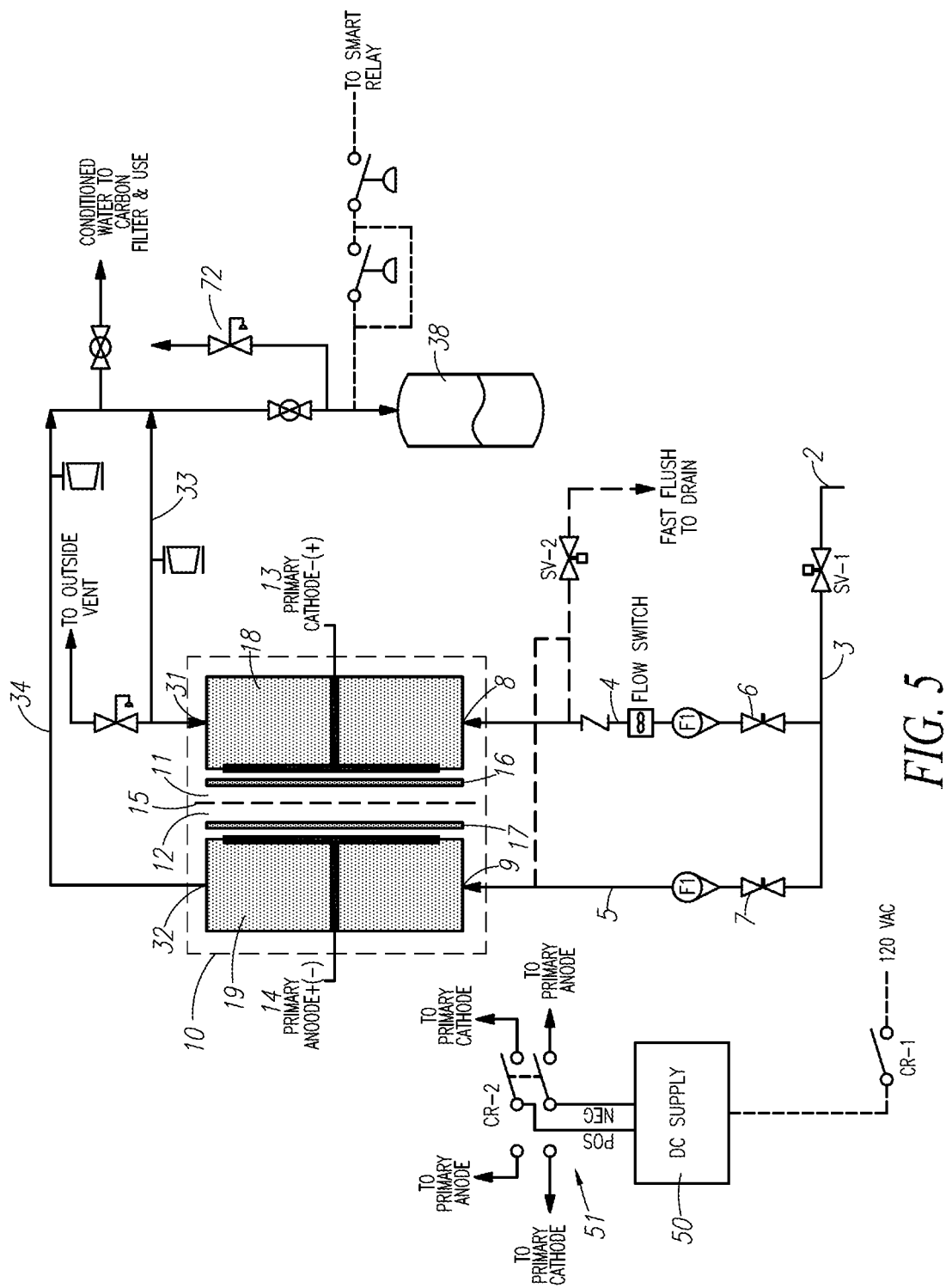
FIG. 5 is a schematic representation of an apparatus according to a further embodiment of the invention.

Regarding the magnesium oxide media filter 71, additional alkalinity can be added to the conditioned water prior to being recirculated through the system. The degree of hardness reduction that is practical depends in part on the amount of hardness and alkalinity in the influent water. Although rare, it is possible that the alkalinity of the influent water is significantly lower than the amount of hardness. Once the alkalinity of water is reduced below about 80 mg/L, the pH of the water is reduced below acceptable levels for domestic use and the water becomes corrosive. According to the Secondary Drinking Water Standards of the Environmental Protection Agency (EPA), as noted briefly above, the pH should be maintained between 6.5 and 8.5. Once the pH falls below 6.5 it becomes corrosive and develops a bitter metallic taste. Thus, it may be desirable to increase the amount of alkalinity of the water so that the degree of hardness (calculated as amount of calcium ions) can be further reduced without going below 80 mg/L of alkalinity. Suitable media for increasing alkalinity include, but are not limited to, magnesium oxide and sodium bicarbonate. A preferred media is magnesium oxide, sold commercially by Clack Corporation under the trade name Corosex. The additional alkalinity may be incorporated by way of installing a filter 90 containing the media along a conduit 62 carrying conditioned water to be recycled, as shown in FIG. 5.

Figure 4:
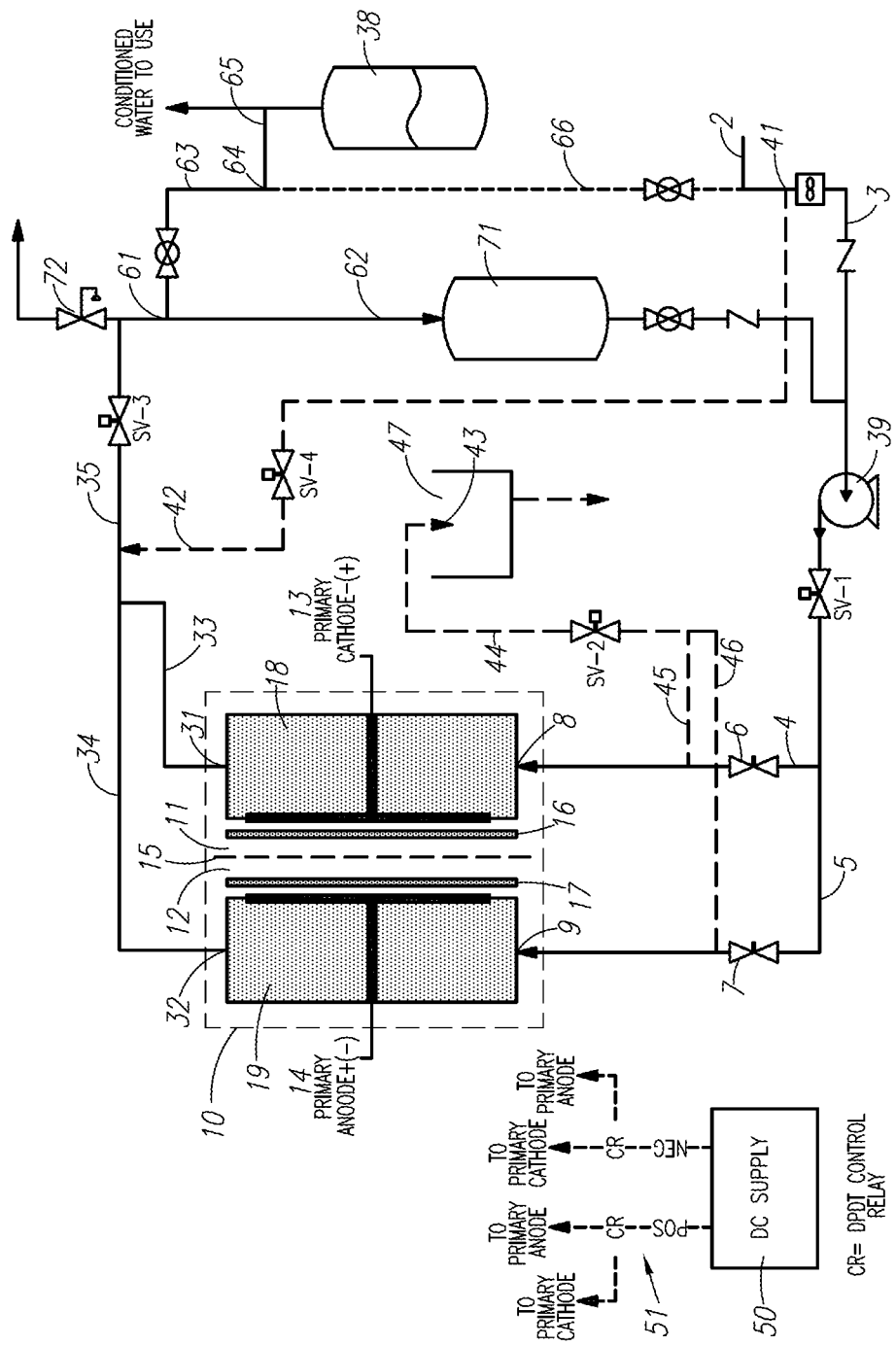
FIG. 4 is a schematic representation of an apparatus according to another embodiment of the invention.

With respect to the reconfigured flow paths shown in FIG. 4, conditioned water will travel along conduit 35 until it reaches junction 61. At junction 61, the flow will be directed either to conduit 62 or to conduit 63. The water will flow through conduit 62 if it is determined that alkalinity needs to be added to the water prior to being sent through the electrochemical cell again via conduit 3. If additional alkalinity is not needed, the water will flow through conduit 63 until it reaches junction 64. At junction 64, the flow will be directed either to the system outlet (not shown) via conduit 65, or to be recycled through the electrochemical cell via bypass conduit 66.

A third embodiment is described with reference to FIG. 5. Explanations of overlaps between the present embodiment and the above-described embodiment are omitted. The apparatus in the third embodiment is different from the apparatus in the first embodiment and the second embodiment in that the apparatus is an on-demand cell without recirculation capabilities. In this embodiment, the conditioned water in conduit 35 will either be directed to the system outlet or to the reservoir 38. Thus, when water is requested by the end user, conditioned water will either be sent directly to use through the system outlet or it can be supplied by the reservoir 38. Additionally, a flow switch has been added to conduit 4 to detect the flow of water through the system inlet and flow meters have been added to conduits 4 and 5 to monitor the flow rate.

In an optional aspect of the invention, the apparatus can also include a carbon filter, which will be used to purify water for drinking purposes, mainly by the removal of chlorine. When a carbon filter is used, water will be directed to flow through the carbon filter just prior to being directed to the system outlet for use. Suitable carbon filters in accordance with the invention include any carbon filter suitable for filtering drinking water and will be apparent to those of ordinary skill in the art in view of the instant disclosure.

A further understanding of the method and apparatus of the invention will be had from the following non-limiting examples.

Example 1

Using a cell with a recirculating pump and a reservoir, exemplary control parameters for the preferred embodiment as shown in FIG. 1 could be as follows:

TABLE 3

| | STEP | | | | | | |
|---|---|---|---|---|---|---|---|
| | 1 Soften Primary Cathode | 2 Descale Primary Cathode | 3 Flush Primary Cathode | 4 Soften Primary Anode | 5 Descale Primary Anode | 6 Flush Primary Anode | Stand-by |
| EQUIPMENT | | | | | | | |
| Pump | ON | OFF* | ON | ON | OFF* | ON | OFF |
| DC Power | ON | ON | ON | ON | ON | ON | OFF |
| Positive Output | Primary ANODE | Primary CATHODE | Primary CATHODE | Primary CATHODE | Primary ANODE | Primary ANODE | LAST POSITION |
| Negative Output | Primary CATHODE | Primary ANODE | Primary ANODE | Primary ANODE | Primary CATHODE | Primary CATHODE | LAST POSITION |
| SV-1 | OPEN | CLOSED | CLOSED | OPEN | CLOSED | CLOSED | CLOSED |
| SV-2 | CLOSED | CLOSED | OPEN | CLOSED | CLOSED | OPEN | CLOSED |
| SV-3 | OPEN | OPEN | CLOSED | OPEN | OPEN | CLOSED | OPEN |
| SV-4 | CLOSED | CLOSED | OPEN | CLOSED | CLOSED | OPEN | CLOSED |

*Note:
the pump can remain on during steps 2 and 5, although this configuration is not preferable.

When on, the system runs sequentially through steps 1-6 and then loops back from step 6 to step 1. As noted above, the system runs when the pump runs and goes into standby when the pump shuts off. The system will start again in the same step that it was in when the pump last stopped. Additionally, four adjustable timers are used: a timer for the soften cycle (10 to 90 minutes), a timer for the descale cycle (30 to 300 seconds), a timer for the flush cycle (5-30 seconds), and a timer for the pump after the flow of influent water through the influent water inlet stops (1-60 minutes).

Example 2

For Example 2, an experimental system was built and configured according to FIG. 1. With respect to the materials of the electrochemical cell, the electrodes are made of iridium oxide coated titanium expanded metal manufactured by Water Star Inc., the CEM was manufactured by Mega Corporation, and the gaskets are composed of Santoprene rubber. With respect to size, the electrochemical cell had an active electrode area of 52 sq. in. and a total volume of 350 ml, wherein the CEM divided the cell into separate anode and cathode chambers of approximately 175 ml each. The amperage was held constant at 2.75 amperes and a volume of 12.5 gallons (47.3 L) was recirculated through the electrochemical cell from the reservoir at a flow rate of 1-1.2 L/min (during the soften cycle). With respect to the timing of the cycles, the soften cycle, descale cycle, and flush cycle were run for 1800 seconds (30 minutes), 120 seconds, and 11 seconds, respectively, with a flow rate of 0.9 L in 11 seconds for the flush cycle.

Table 4 shows the reduction in hardness that is obtained with the cell of Example 2.

TABLE 4

| Time | Conductivity (US) | Hardness (mg/L as CaCO3) | Alkalinity (mg/L as CaCO3) | Amp-Hrs | Amp-Hrs/L | Hardness Removed (mg) |
|---|---|---|---|---|---|---|
| 7:52 | 1110 | 245.4 | 198 | 0.00 | 0.00 | 0 |
| 9:44 | 1011 | 203.1 | 154 | 4.79 | 0.10 | 2000.79 |

TABLE 4-continued

| Time | Conductivity (US) | Hardness (mg/L as CaCO3) | Alkalinity (mg/L as CaCO3) | Amp-Hrs | Amp-Hrs/L | Hardness Removed (mg) |
|---|---|---|---|---|---|---|
| 11:48 | 883 | 154.8 | 122 | 10.07 | 0.21 | 4285.38 |
| 14:38 | 774 | 106.5 | 94 | 17.35 | 0.37 | 6569.97 |
| 16:32 | 717 | 98.5 | 90 | 22.12 | 0.47 | 6948.37 |

Example 3

An experimental system was built and configured according to FIG. 1, except that no CEM was present. The remaining conditions in Example 2 were maintained here and are set forth again as follows. With respect to the materials of the electrochemical cell, the electrodes are made of iridium oxide coated titanium expanded metal manufactured by Water Star Inc., the CEM was manufactured by Mega Corporation, and the gaskets are composed of Santoprene rubber. With respect to size, the electrochemical cell had an active electrode area of 52 sq. in. and a total volume of 350 ml. The amperage was held constant at 2.75 amperes and a volume of 12.5 gallons (47.3 L) was recirculated through the electrochemical cell from the reservoir at a flow rate of 1-1.2 L/min (during the soften cycle). With respect to the timing of the cycles, the soften cycle, descale cycle, and flush cycle were run for 1800 seconds (30 minutes), 120 seconds, and 11 seconds, respectively, with a flow rate of 0.9 L in 11 seconds for the flush cycle.

Table 5 shows the reduction in hardness that is obtained with the cell of Example 3.

TABLE 5

| Time | Conductivity (US) | Hardness (mg/L as CaCO3) | Alkalinity (mg/L as CaCO3) | Amp-Hrs | Amp-Hrs/L | Hardness Removed (mg) |
|---|---|---|---|---|---|---|
| 7:58 | 1075 | 229.3 | 188 | 0.00 | 0.00 | 0 |
| 9:55 | 911 | 197 | 176 | 5.00 | 0.11 | 1527.79 |
| 11:48 | 842 | 183 | 148 | 9.82 | 0.21 | 2189.99 |
| 14:06 | 780 | 144.8 | 126 | 15.63 | 0.33 | 3996.85 |
| 16:36 | 736 | 114.6 | 116 | 22.12 | 0.47 | 5425.31 |

Figure 8:
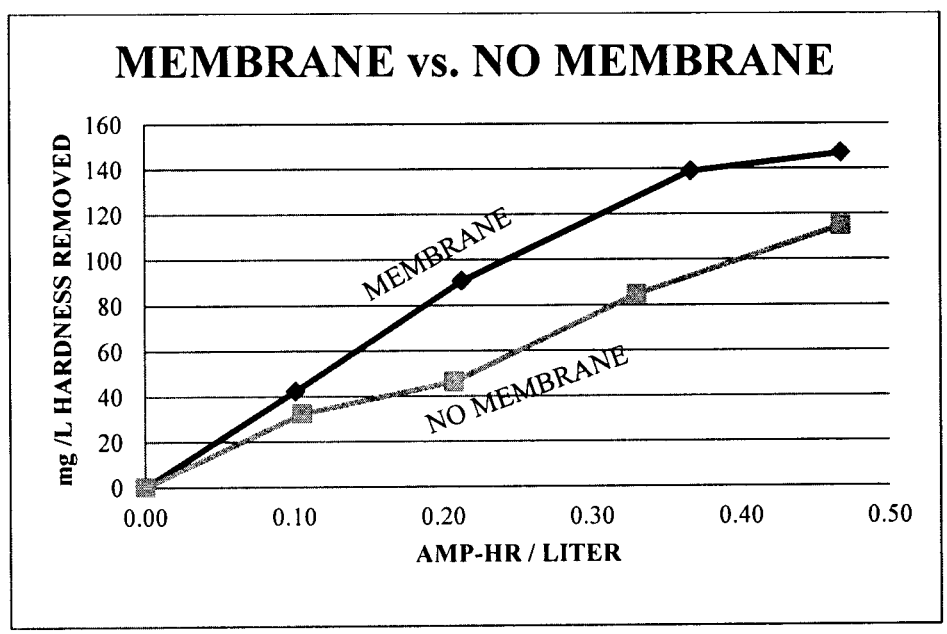
FIG. 8 shows a chart plotting data from Tables 4 and 5.

FIG. 8 displays the reduction in hardness obtained with the apparatus according to Example 2 (with CEM) as compared to the reduction in hardness obtained with the apparatus according to Example 3 (no CEM).

Chart 3 displays the reduction in hardness obtained with the apparatus according to Example 2 (with CEM) as compared to the reduction in hardness obtained with the apparatus according to Example 3 (no CEM).

As can be seen in FIG. 8, when a cation exchange membrane is present in the electrochemical cell, the cell is capable of removing hardness to a greater extent than an electrochemical cell without a cation exchange membrane.

Example 4

An experiment was conducted to determine whether or not phosphate is removed along with calcium in the electrochemical cell. A flow of 1.4 L/min was provided to the primary anode and cathode chambers of the electrochemical cell, and the water was treated at 2.75 A. The sample volume was 10 L and the cycle was as follows: (1) soften in the primary cathode chamber for 20 min; (2) reverse polarity with no flow for 200 seconds; (3) flush the electrochemical cell for 12 seconds; (4) stir tank and take sample. Repeat steps 1-4 softening in the primary anode chamber.

A typical removal curve for hardness and alkalinity is shown in FIG. 7. Table 6 summarizes the results achieved in Example 4.

TABLE 6

| TIME (MIN) | 0 | 20 | 40 | 60 |
|---|---|---|---|---|
| AMP-MIN/L | 0 | 0.0917 | 0.183 | 0.275 |
| pH | 7.69 | 7.68 | 7.81 | 7.59 |
| COND (uS) | 2290 | 2163 | 2157 | 2099 |
| Ca as CaCO3 | 95 | 85 | 75 | 75 |
| PO4 as P | 42.25 | 37.2 | 33.4 | 30.8 |
| P as HPO4 | 130.85 | 115.21 | 103.44 | 95.39 |
| HPO4 as CaCO3 | 136.30 | 120.01 | 107.75 | 99.37 |
| ALK AS CaCO3 | 410 | 390 | 385 | 375 |

Figure 9:
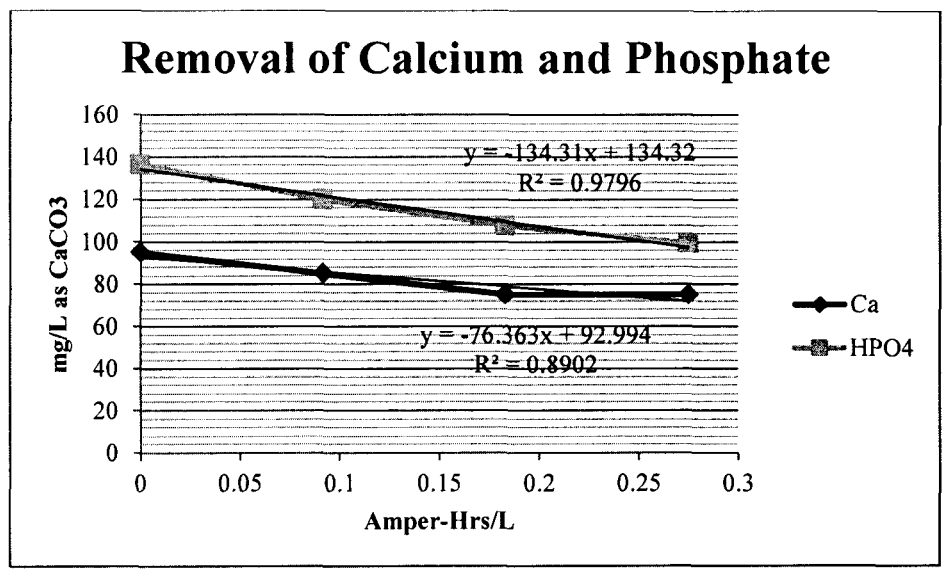
FIG. 9 shows a chart plotting data from Table 6.
Figure 10:
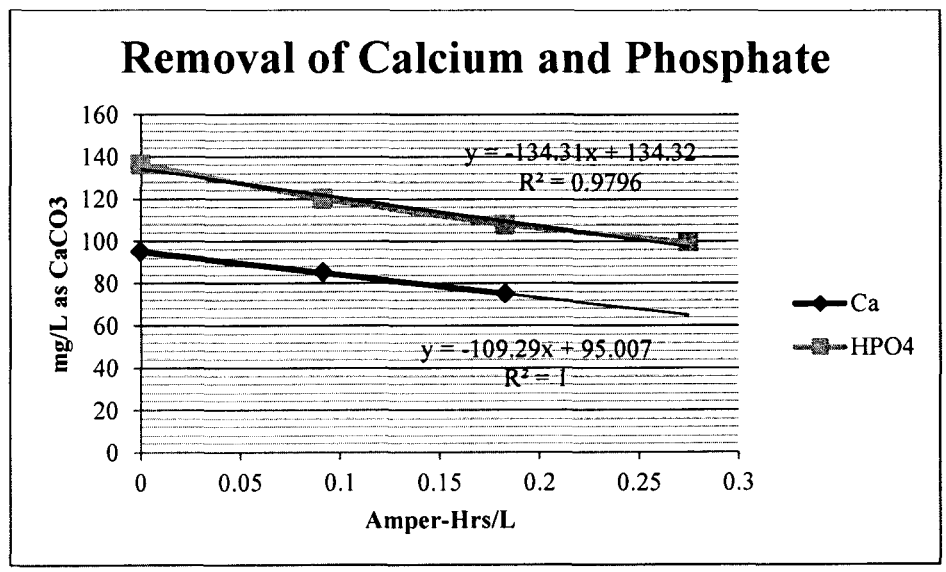
FIG. 10 shows a chart plotting data from Table 6.

FIGS. 9 and 10 show that calcium and phosphates are removed at approximately the same rates.

The current test had less than 100 mg/L of calcium to start with, so the amount removed was not especially high. However, the results show conclusively that phosphate is removed, but that the apparatus was not particularly effective on solutions with <100 mg/L of calcium.

Figure 11:
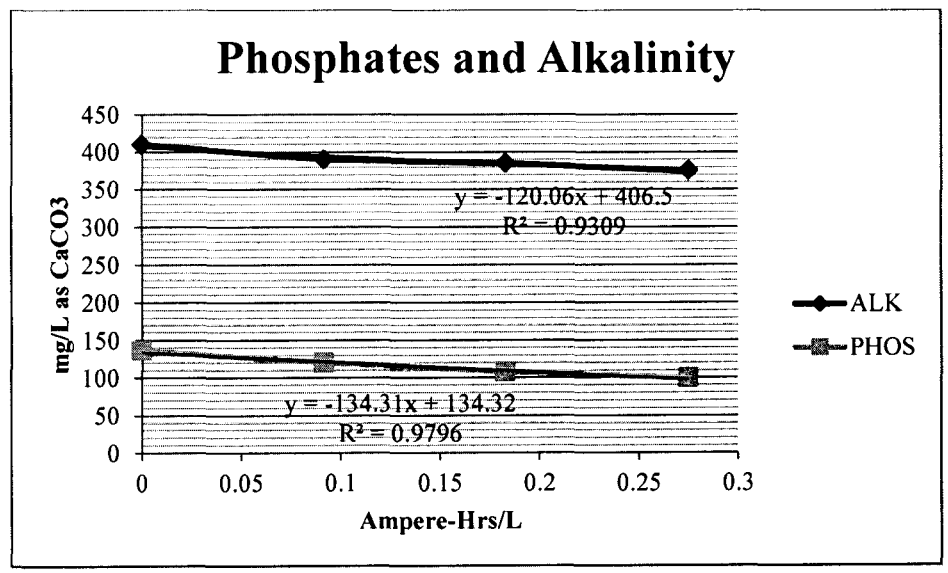
FIG. 11 shows a chart plotting data from Table 6.

In the current test, phosphate can be considered as a form of alkalinity that competes with carbonate in the precipitation of calcium. At the pH of the feed solution, virtually all of the phosphate is present as the ion $HPO_4^{2-}$. Accordingly, if total alkalinity is defined by $HCO_3^-$ plus $HPO_4^{2-}$, both expressed as CaCO3, the amount of reduction for each should be equal. FIG. 11 appears to confirm this, as does the initial and final concentration of phosphate and alkalinity. The results show that 36.93 mg/L of phosphates and 35 mg/L of alkalinity was removed in the test. For practical purposes, the removal is the same. This implies that precipitation of calcium phosphate is favored over the precipitation of calcium carbonate. This is consistent with the solubility vs. pH relationships of these two compounds

What is claimed is:

1. A method of precipitating scale from water, comprising the steps of:
   a) providing an electrochemical cell, the electrochemical cell comprising a primary cathode chamber including a first electrode in the primary cathode chamber, a primary anode chamber including a second electrode in the primary anode chamber, and a cation exchange membrane separating the primary cathode chamber from the primary anode chamber;
   b) splitting a flow of feed water into separate input flows to each of the primary cathode chamber and the primary anode chamber;
   c) reducing the pH of water in the primary anode chamber by electrolysis;
   d) increasing the pH of water in the primary cathode chamber by electrolysis, and removing cations from the water in the primary cathode chamber by forming scale on the first electrode in the primary cathode chamber;
   e) combining separate treated water output flows, from each of the primary cathode chamber and primary anode chamber, into a combined conditioned water flow; and
   f) flushing scale from the electrochemical cell, the flushing comprising flowing water from a conduit connected to the combined conditioned water flow through an outlet of the primary cathode chamber and an outlet of the primary anode chamber of the electrochemical cell, and discharging flush water carrying scale from the electrochemical cell through the inlet of the primary cathode chamber and the inlet of the primary anode chamber.

2. The method of claim 1, wherein the electrochemical cell treats the water in the primary cathode chamber and the water in the primary anode chamber at less than 0.2 Amphour/liter, and calcium ions are removed from the water in the primary cathode chamber at a substantially greater rate than magnesium ions.

3. The method of claim 1, wherein the separate treated water output flows, that are combined into the conditioned water flow, include a high pH flow from the primary cathode chamber and having a pH value greater than 8.5, and a low pH flow from the primary anode chamber and having a pH value not less than 4.5.

4. The method of claim 1, further comprising the step of recirculating combined conditioned water as the flow of feed water.

5. The method of claim 4, wherein the step of recirculating the combined conditioned water includes adding alkalinity to the conditioned water, the method further comprising the step of venting hydrogen gas from the conditioned water.

6. A method of precipitating scale from water comprising the steps of:
   a) providing an electrochemical cell, the electrochemical cell comprising a primary cathode chamber including a first electrode in the primary cathode chamber, a primary anode chamber including a second electrode in the primary anode chamber, and a cation exchange membrane separating the primary cathode chamber from the primary anode chamber;
   b) splitting a flow of feed water into separate input flows to each of the primary cathode chamber and the primary anode chamber;
   c) reducing the pH of water in the primary anode chamber by electrolysis;
   d) increasing the pH of water in the primary cathode chamber by electrolysis, and removing cations from the water in the primary cathode chamber by forming scale on the first electrode in the primary cathode chamber;

e) combining separate treated water output flows, from each of the primary cathode chamber and primary anode chamber, into a combined conditioned water flow;

f) descaling the first electrode in the primary cathode chamber by applying a positive DC voltage to the first electrode;

g) flushing, from the primary cathode chamber, scale removed from the first electrode;

h) after said steps of descaling and flushing, reducing the pH of feed water in the primary cathode chamber by electrolysis; and i) after said steps of descaling and flushing, increasing the pH of water in the primary anode chamber by electrolysis, and removing cations from the water in the primary anode chamber by forming scale on the second electrode in the primary anode chamber.

7. The method of claim 6, wherein the step of flushing includes simultaneously flushing the primary anode chamber.

8. The method of claim 6, wherein: a duration of performing the steps c) reducing the pH of water in the primary anode chamber, and d) increasing the pH of water in the primary cathode chamber, before performing the step f) of descaling the first electrode in the primary cathode chamber, is between 10 minutes and 90 minutes; a further duration of performing the step f) of descaling the first electrode in the primary cathode chamber, before performing the step g) of flushing, from the primary cathode chamber, scale removed from the first electrode, is between 30 seconds and 300 seconds; and a still further duration of performing the step g) of flushing, from the primary cathode chamber, scale removed from the first electrode, is between 3 seconds and 45 seconds.

9. The method of claim 6, further comprising the step of stopping the flow of feed water to the electrochemical cell before performing the step f) of descaling.

10. A method of precipitating scale from water, comprising the steps of:

a) providing an electrochemical cell, the electrochemical cell comprising a primary cathode chamber including a first electrode in the primary cathode chamber, a primary anode chamber including a second electrode in the primary anode chamber, and a cation exchange membrane separating the primary cathode chamber from the primary anode chamber;

b) treating water in the primary anode chamber by electrolysis;

c) treating water in the primary cathode chamber by electrolysis, the water in the primary cathode chamber including calcium ions and magnesium ions, wherein:
  i) said treating the water in the primary cathode chamber includes removing the calcium ions from the water in the primary cathode chamber at a substantially greater rate than the magnesium ions, thereby forming calcium scale on the first electrode in the primary cathode chamber, and
  ii) the electrochemical cell treats the water in the primary cathode chamber and the water in the primary anode chamber at less than 0.6 Amp-hour/liter;

d) descaling the first electrode in the primary cathode chamber by applying a positive DC voltage to the first electrode in the primary cathode chamber and a negative DC voltage to the second electrode in the primary anode chamber;

e) flushing, from the primary cathode chamber, calcium scale removed from the first electrode, and simultaneously flushing the primary anode chamber;

f) after said steps of descaling and flushing, further treating water in the primary anode chamber by electrolysis, the water in the primary anode chamber including calcium ions and magnesium ions, said further treating including removing the calcium ions from the water in the primary anode chamber at a substantially greater rate than the magnesium ions, thereby forming calcium scale on the second electrode in the primary anode chamber.

11. The method of claim 10, further comprising the step of splitting a flow of feed water into separate input flows to each of the primary cathode chamber and the primary anode chamber, wherein the separate input flows have substantially equal flow rates.

12. The method of claim 10, further comprising the step of combining separate treated water output flows, from each of the primary cathode chamber and primary anode chamber, into a combined conditioned water flow.

13. The method of claim 12, wherein the separate treated water output flows, that are combined into the conditioned water flow, include a high pH flow from the primary cathode chamber and having a pH value greater than 8.5, and a low pH flow from the primary anode chamber and having a pH value not less than 4.5, and wherein the electrochemical cell treats the water in the primary cathode chamber and the water in the primary anode chamber at less than 0.2 Amp-hour/liter.

14. The method of claim 12, further comprising the steps of recirculating the combined conditioned water as a flow of feed water to the electrochemical cell, and splitting the flow of feed water into separate input flows to each of the primary cathode chamber and the primary anode chamber, wherein the separate input flows have substantially equal flow rates.

15. The method of claim 10, wherein:

a duration of performing the steps b) treating water in the primary anode chamber by electrolysis, and c) treating water in the primary cathode chamber by electrolysis, before performing the step d) of descaling the first electrode in the primary cathode chamber, is between 10 minutes and 90 minutes;

a further duration of performing the step d) of descaling the first electrode in the primary cathode chamber, before performing the step e) of flushing, is between 30 seconds and 300 seconds; and a still further duration of performing the step e) of flushing, is between 3 seconds and 45 seconds.

16. The method of claim 10, further comprising the step of stopping a flow of feed water to the electrochemical cell before performing the step d) of descaling.

17. A system for precipitating scale from water, comprising:

a) an electrochemical cell, the electrochemical cell comprising:
  i) a primary cathode chamber;
  ii) a primary cathode located in the primary cathode chamber;
  iii) a primary anode chamber;
  iv) a primary anode located in the primary anode chamber; and
  v) a cation exchange membrane separating the primary cathode chamber from the primary anode chamber;
  vi) a first end plate;

vii) a first gasket between the first end plate and the cation exchange membrane;
viii) a second end plate;
ix) a second gasket between the second end plate and the cation exchange membrane; and
x) a plurality of tie rods securing the first end plate to the second end plate;

b) a power supply operatively connected to the electrochemical cell to apply a voltage between the primary cathode and the primary anode;

c) a switching device configured to reverse polarity of the voltage between the primary cathode and the primary anode;

d) at least one supply conduit operatively connected to the electrochemical cell to supply feed water to the electrochemical cell, wherein the at least one supply conduit is configured to provide separate input flows of feed water at substantially equal flow rates to each of the primary cathode chamber and the primary anode chamber; and e) at least one combined conditioned water conduit operatively connected to the electrochemical cell to receive and combine water output flows from each of the primary cathode chamber and the primary anode chamber, into a combined conditioned water flow.

18. The system of claim 17, further comprising:
f) a recirculation conduit operatively connected to recirculate combined conditioned water as the feed water; and
g) a reservoir receiving and storing the combined conditioned water, received from the at least one combined conditioned water conduit.

19. The system of claim 17, wherein the electrochemical cell and the power supply are configured to treat water in the primary cathode chamber and water in the primary anode chamber at less than 0.2 Amp-hour/liter by a DC current flow between the primary cathode chamber and the primary anode chamber, and remove calcium ions from the water in one of the primary cathode chamber and the primary anode chamber at a substantially greater rate than magnesium ions.

20. The system of claim 19, wherein the calcium ions are removed from the water as calcium scale formed on one of the primary cathode and the primary anode, and the calcium scale formed on said one of the primary cathode and the primary anode is automatically descaled by operation of the switching device reversing the polarity of the voltage between the primary cathode and the primary anode.

21. The system of claim 17, wherein said water output flows include a first water output flow having a pH value greater than 8.5, and a second water output flow having a pH value not less than 4.5.

* * * * *